July 7, 1931. C. H. REDFERN 1,813,817
MACHINE FOR THE PURPOSE OF HOLDING AND RELEASING
ANIMALS IN VARIOUS CONTESTS OF SPEED
Filed Sept. 12, 1927 3 Sheets-Sheet 1

INVENTOR.
Charles Henry Redfern
BY James H. Splain
ATTORNEY.

July 7, 1931.  C. H. REDFERN  1,813,817
MACHINE FOR THE PURPOSE OF HOLDING AND RELEASING
ANIMALS IN VARIOUS CONTESTS OF SPEED
Filed Sept. 12, 1927  3 Sheets-Sheet 2

INVENTOR.
Charles Henry Redfern
BY James H. Splain
ATTORNEY.

July 7, 1931.  C. H. REDFERN  1,813,817
MACHINE FOR THE PURPOSE OF HOLDING AND RELEASING
ANIMALS IN VARIOUS CONTESTS OF SPEED
Filed Sept. 12, 1927   3 Sheets-Sheet 3
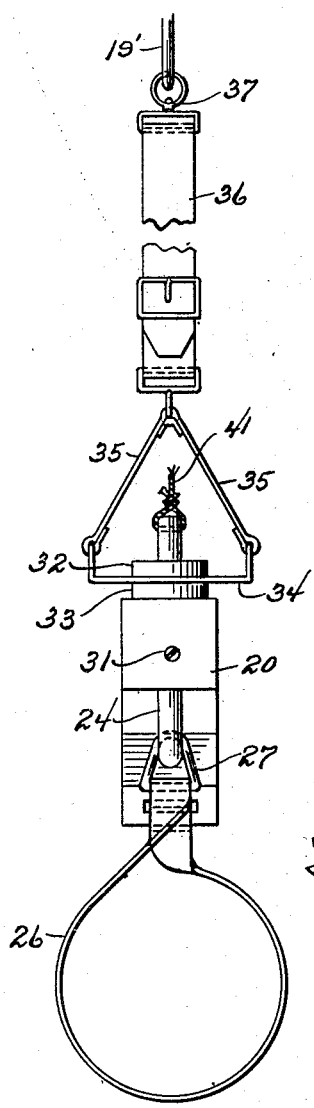
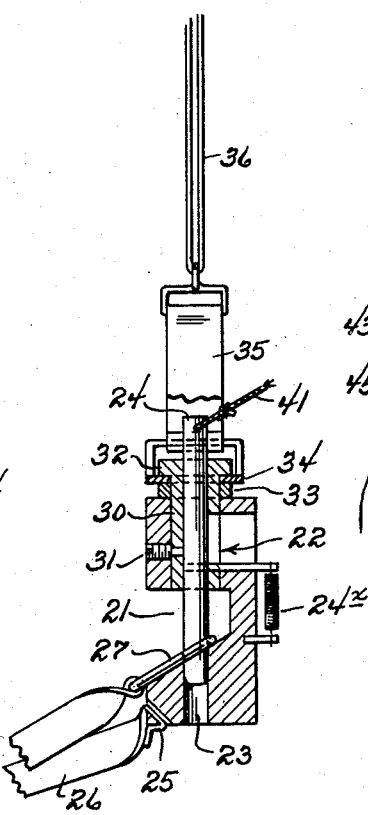
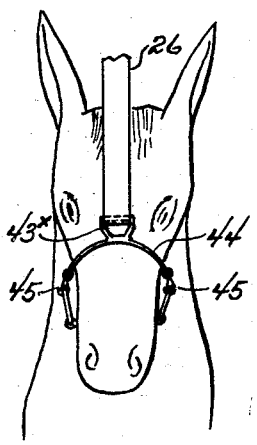
INVENTOR.
Charles Henry Redfern
BY James L. Splain
ATTORNEY.

Patented July 7, 1931

1,813,817

UNITED STATES PATENT OFFICE

CHARLES HENRY REDFERN, OF ST. LOUIS, MISSOURI

MACHINE FOR THE PURPOSE OF HOLDING AND RELEASING ANIMALS IN VARIOUS CONTESTS OF SPEED

Application filed September 12, 1927. Serial No. 219,050.

The object of my present invention is the provision of peculiar and advantageous means for holding several animals and simultaneously releasing the same to assure each animal being given an even chance at the start of a race.

To the attainment of the foregoing, the invention consists in the improvement as hereinafter described and definitely claimed.

In the accompanying drawings, forming part of this specification:

Figure 4 is an enlarged detail elevation of one of the devices for holding horses.

Figure 5 is a view of the same taken at right angles to Figure 4.

Figure 6 is a view illustrative of the manner in which a horse is held by an alternative form of part of said device.

Figure 8 is a perspective view of a stall arrangement hereinafter explicitly referred to.

Similar numerals designate corresponding parts in all of the views of the drawings.

Figure 1:
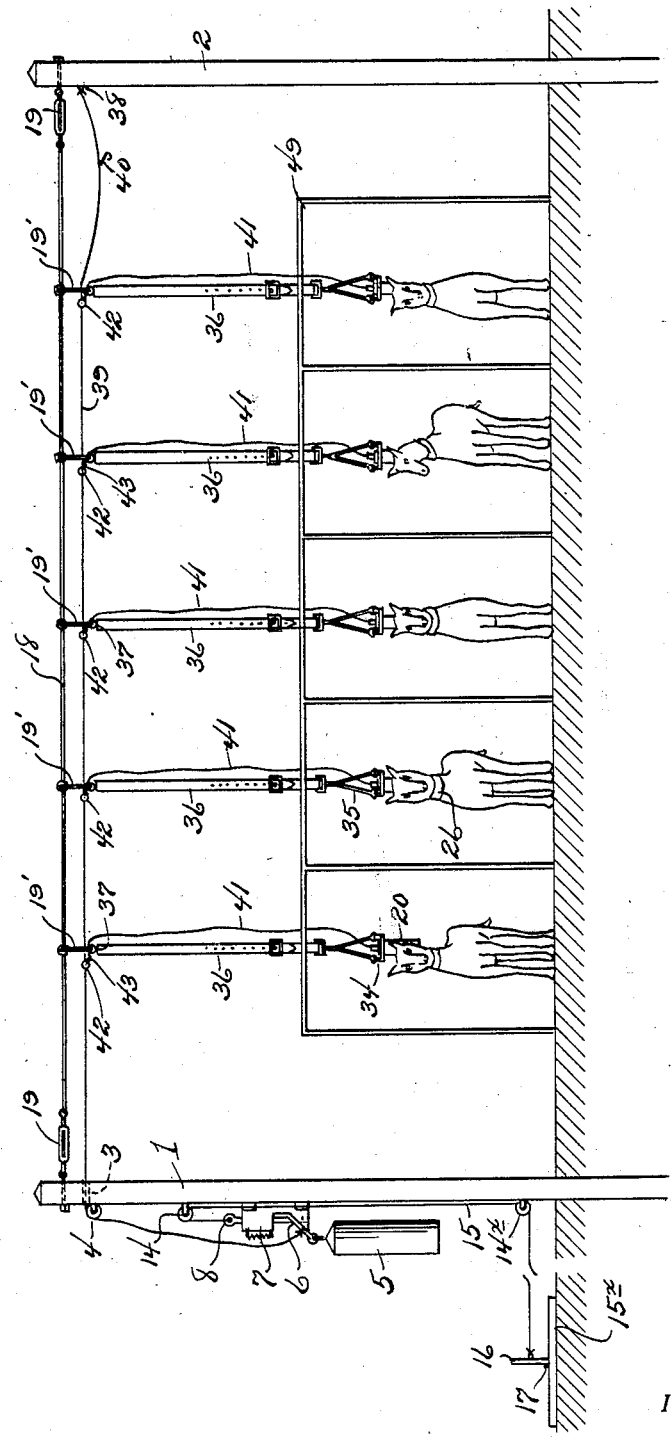
Figure 1 is a front elevation showing the preferred embodiment of my invention.
Figure 2:
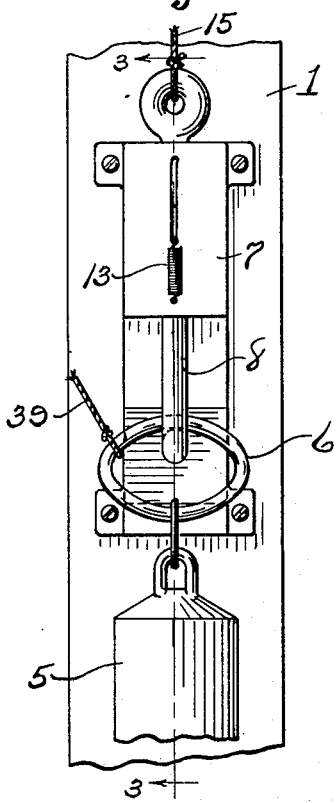
Figure 2 is an enlarged detail elevation of the weight-holding device.
Figure 3:
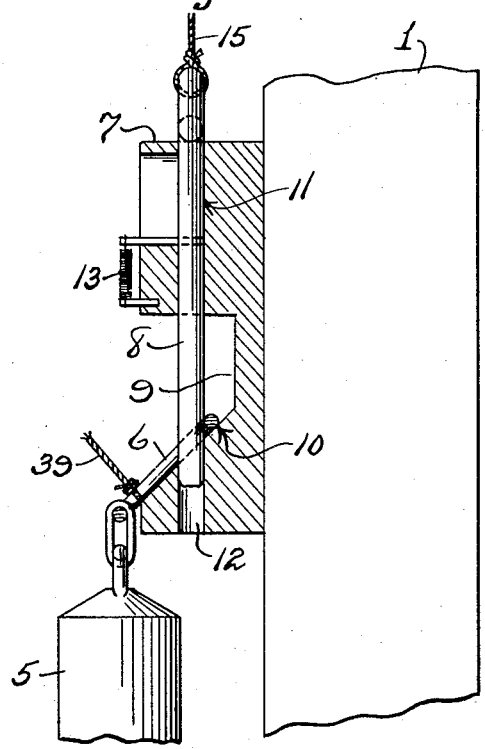
Figure 3 is a view of the same, partly in elevation and partly in section, at right angles to Figure 2.

In furtherance of my invention I employ two fixed upright posts 1 and 2 at opposite sides of a race track.

The post 1 is provided with a transverse bore 3, and is also provided with a pulley 4 located at the outer end of said bore.

At the outer side of the post 1 is a weight 5 to the upper end of which is permanently attached in loose manner a large ring 6.

The weight 5 is designed to be normally and detachably held against gravitation through the medium of a latch. This latch comprises a body 7 and a bolt 8. The said body 7 is fixed to the outer side of the post 1 and is characterized by a recess 9 the lower wall 10 of which is inclined, a vertical bore 11 for the bolt 8, above the recess 9 and a bore 12 for the bolt, below the recess 9; said bores being in vertical alinement. A spring 13 serves to yieldingly hold the bolt 8 in the bore 12, and when the bolt is so held with the ring 6 behind it gravitation of the weight 5 will be prevented. When, however, the bolt 8 is moved upwardly, the ring 6 will be released and permitted to slip down the wall 10 and the weight 5 will be permitted to gravitate for a purpose presently described.

For the purpose of enabling an authorized person located at a distance from the post 1 to raise the bolt 8 and release the weight 5 I provide means including sheaves 14 and $14^x$ on the post, a cable 15 passed over and under said sheaves, respectively, and connected at one end to the upper end of the bolt 8, a base member $15^x$ designed to be arranged on the ground or on any other supporting means, and a swingable member 16 hingedly connected at 17 to the base $15^x$ and designed to be moved in a direction away from the post 1 by the foot of the operator, or otherwise. Manifestly when the member 16 is so moved the bolt 8 will be raised and the weight 5 will be released and permitted to gravitate for a purpose presently described.

Interposed between and connected to the posts 1 and 2 at a suitable distance above the ground is a sectional suspension rod 18, the sections of the rod being connected by turnbuckles 19 through the medium of which the rod may be readily rendered taut.

Connected to and pendent from the rod 18 and spaced apart are large rings $19^x$, one for each of the dogs or other animals to be individually held and to be released together by a single operation attended by gravitation of the weight 5. Of course any desired number of the rings $19^x$ may be employed according to the width of the track.

Each of the rings $19^x$ is equipped with a latch pendent therefrom, and as said latches and their appurtenances are identical in construction a detailed description of one latch and at its appurtenances will suffice to impart a definite understanding of all. The latch referred to comprises a body 20 recessed at 21 and having bores 22 and 23 above and below said recess and also having the lower wall of the recess inclined, and a bolt 24 in said bores and movable upwardly out of the lower bore 23. Connected at one end to the lower end of the body 20, as designated by 25, is a strap 26 designed to be passed around the neck of a dog and having at its free end an eye 27 to receive and be detachably held by the bolt 24. Manifestly when the bolt 24 is moved upwardly the eye end of the strap 26 will be released and the strap will drop from around the animal's neck and release the animal. The bolt 24 is disposed in a sleeve 30, fixed at 31 in the body 20 and having a flange 32 at its upper end.

Connected to the bolt 24 is a spring 24$^x$ for yieldingly holding it against upward movement. A washer 33 is arranged below the flange 32 of the sleeve 30, and between the washer 33 and flanges 32 and about the sleeve 30 is a U-shaped connector 34 the upwardly reaching arms of which are connected to straps 35 which, in turn, are buckled to a single strap 36, connected by a swivel 37 to the lower portion of its respective ring 19$^x$.

Connected at one end 38 to the post 2 and extending through the bore 3 and over the sheave 4 of the post 1 is a cable 39, preferably in the form of a thin, flexible wire, the opposite end of which is connected to the ring 6. There is considerable slack in the cable 39 between the points of connection of said cable to the post 2 and the ring 6. This slack is taken up by engaging a hook 40 on cable 39 with the eye at the point of connection 38, and when the hook 40 is so engaged the cable 39 cannot be moved toward the left in Figure 1. When, however, the hook 40 is disengaged from the eye at 38 there will be considerable slack in the cable 39 between the eye at 38 and the ring 6, as will be readily understood, and consequently when the ring 6 is released as before described and the weight 5 gravitates, the slack portion of the cable 39 will be pulled toward the left in Fig. 1. The purpose of this will be understood when it is stated that cables 41 are connected to the several bolts 24, are passed loosely toward the left through the rings 19 and are connected with the cable 39.

From this it follows that when by the gravitation of weight 5 the slack cable 39 is pulled toward the left in Figure 1, the several bolts 24 will be simultaneously retracted and all of the held animals will be released at substantially the same time. The cable 39 is preferably equipped with small rings 42, and the cables 41 are provided with snap hooks 43, connected in swivelled manner to the cables 41 and engaged with said rings 42. Thus the cables 41 are connected with the cable 39 as before described.

When it is desired to hold horses instead of dogs, the straps 26 are passed loosely through eyes 43$^x$ on U-shaped bars 44, Figure 6; the said bars 44 being equipped at their ends with snap hooks 45 designed to be engaged with bridle rings on horses' heads, and the said bars 44 being designed to bridge the muzzles of the horses.

Figure 8:
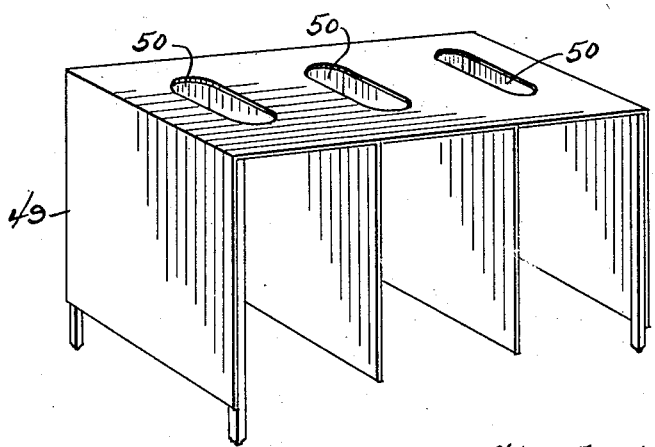
Figure 7:
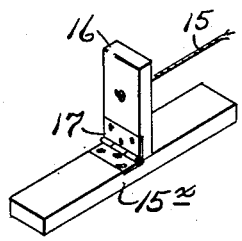
Figure 7 is a detail perspective view of an operating device designed to be used in association with the cable 15 shown in Figure 1.

When deemed expedient the dogs or horses as the case may be, may be arranged in stalls 49, Figure 8, so that the animals cannot see each other. In this arrangement the latch bodies 20 may be loosely arranged in openings 50 in the top walls of the stalls. The said stalls may be of the construction shown in Figure 8 or of any other suitable construction; and I would also have it distinctly understood that I do not limit myself to the use of stalls in conjunction with the apparatus as disclosed in Figure 1.

I have specifically described the preferred embodiment of my invention in order to impart a full, clear and exact understanding of the same. I do not desire, however, to be understood as limiting myself to the construction of said embodiment, my invention being defined by my appended claims within the scope of which modifications may be made without departure from my invention.

Having described my invention, what I claim and desire to secure by Letters Patent, is:

1. In combination, spaced posts, a suspension rod between the same and spaced above the ground, pendent rings spaced apart on said rod, a cable connected with one post and movable relative to the other post and also movable through said rings, gravitational means connected to said cable and adapted when released and permitted to gravitate to suddenly pull the cable through the rings, means for holding and releasing said gravitational means, latches connected with and pendent from said rings and having straps connected at one end to the latches and also having spring-influenced bolts for detachably holding the opposite ends of the straps, and cables connected to the first-named cable and to said bolts and movable through said rings.

2. In combination, spaced posts, a suspension rod between the same and spaced above the ground, pendent rings spaced apart on said rod, a cable connected with one post and movable relative to the other post and also movable through said rings, gravitational means connected to said cable and adapted when released and permitted to gravitate to suddenly pull the cable through the rings, means for holding and releasing said gravitational means, latches connected with and pendent from said rings and having straps connected at one end to the latches and also having spring-influenced bolts for detachably holding the opposite ends of the straps, and cables connected to the first-named cable and to said bolts and movable through said rings; the said gravitational means including a weight and a large ring connected thereto and also connected to the first-named cable, and the said means for holding and releasing the weight including a latch body on the post relative to which the first-named cable is movable and having a recess the lower wall of which is inclined and also having upper and lower bores, a bolt movable in said bores and adapted to engage and detachably hold the weight ring, a cable guided on said post and connected at one end to said bolt, and a device located at a distance from said post and having a member connected to said cable and adapted to be moved by an authorized person and when so moved to retract said bolt and release the weight ring.

3. In combination, spaced posts, a suspension rod between the same and spaced above the ground, pendant rings spaced apart on said rod, a cable connected with one post and movable relative to the other post and also movable through said rings, gravitational means connected to said cable and adapted when released and permitted to gravitate to suddenly pull the cable through the rings, means for holding and releasing said gravitational means, latches connected with and pendent from said rings and having straps connected at one end to the latches and also having spring-influenced bolts for detachably holding the opposite ends of the straps, and cables connected to the first-named cable and to said bolts and movable through said rings; the said latches including bodies with recesses the lower walls of which are inclined and with bores receiving the bolts, and also including flanged sleeves in the bores and connected to the bodies and receiving the bolts and connectors loosely receiving the sleeves below the flanges thereof and having upwardly reaching arms, and straps connected to said arms, and single straps connected with the first-named straps and connected in swivelled manner with the large rings on the suspension rods.

4. In combination spaced supports, suspension means between the same, a cable connected with one support and movable relative to the other support, spaced pendent means on the suspension means receiving and adapted to guide said cable, latches connected with and pendent from said spaced pendent means and having straps connected at one end to the latches and also having bolts for detachably holding the opposite ends of the straps, and cables connected to the first-named cable and to said bolts and movable through said pendent means on the suspension means.

CHARLES HENRY REDFERN.